(12) United States Patent
Galvin, Jr. et al.

(10) Patent No.: US 8,938,462 B2
(45) Date of Patent: Jan. 20, 2015

(54) ADAPTIVELY ASSESSING OBJECT RELEVANCE BASED ON DYNAMIC USER PROPERTIES

(75) Inventors: James P. Galvin, Jr., Georgetown, KY (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 13/456,018

(22) Filed: Apr. 25, 2012

(65) Prior Publication Data

US 2013/0290349 A1 Oct. 31, 2013

(51) Int. Cl.
*G06F 17/30* (2006.01)

(52) U.S. Cl.
USPC ............................. 707/749; 705/35

(58) Field of Classification Search
USPC ............................. 707/749; 705/35
See application file for complete search history.

(56) References Cited

U.S. PATENT DOCUMENTS

| | | | |
|---|---|---|---|
| 6,078,916 A | 6/2000 | Culliss | |
| 6,330,546 B1* | 12/2001 | Gopinathan et al. | 705/35 |
| 8,413,181 B2* | 4/2013 | Riedl et al. | 725/32 |
| 2002/0194119 A1* | 12/2002 | Wright et al. | 705/38 |
| 2009/0281997 A1 | 11/2009 | Jain | |
| 2010/0005106 A1* | 1/2010 | Carter et al. | 707/100 |
| 2010/0211694 A1 | 8/2010 | Razmov et al. | |
| 2011/0288978 A1* | 11/2011 | Abifaker | 705/35 |
| 2013/0055097 A1* | 2/2013 | Soroca et al. | 715/738 |

FOREIGN PATENT DOCUMENTS

WO 2011/067781 6/2011

OTHER PUBLICATIONS

Preliminary Remarks, May 4, 2012, for U.S. Appl. No. 13/464,812, filed May 4, 2012 by J.P. Galvin, Jr. et al., Total 2 pp. [57.264C1 (PrelimRemarks)].
U.S. Appl. No. 13/464,812, filed May 4, 2012, entitled "Adaptively Assessing Object Relevance Based on Dynamic User Properties", invented by Galvin, Jr., J.P. and A.L. Schirmer, Total 28 pp. [57.264C1 (Appln)].
Office Action 1 for U.S. Appl. No. 13/464,812, dated Jul. 15, 2013, 18 pp. [57.264C1 (OA1)].
Response to Office Action 1 for U.S. Appl. No. 13/464,812, dated Oct. 15, 2013, 7 pp. [57.264C1 (ROA1)].
Amendment 2, Apr. 2, 2014, for U.S. Appl. No. 13/464,812, filed May 4, 2012 by J.P. Galvin et al., Total 8 pp. [Amend2 (57.264C1)].
Final Office Action 1, Jan. 17, 2014, for U.S. Appl. No. 13/464,812, filed May 4, 2012 by J.P. Galvin et al., Total 16 pp. [FOA1 (57264C1)].

(Continued)

*Primary Examiner* — Cam-Y Truong
(74) *Attorney, Agent, or Firm* — Janaki K. Davda; Konrad, Raynes, Davda & Victor LLP

(57) ABSTRACT

Provided are techniques for assessing object relevance. One or more user usage patterns are retrieved. Object properties of one or more objects are retrieved. The one or more user usage patterns are compared against the object properties of the one or more objects to compute one or more interaction scores that represent a value of how an object interacts with a user based on a current context of the user. Object importance is assigned to each of the one or more objects based on the one or more interaction scores.

14 Claims, 6 Drawing Sheets

(56) References Cited

OTHER PUBLICATIONS

Caglayan, A., M. Snorrason, J. Jacoby, J. Mazzu, R. Jones, and K. Kumar, "Learn Sesame—a Learning Agent Engine", [online]. Retrieved from the Internet at <URL: http://www.google.com/url?sa=t&source=web&cd=3&sqi=2&ved=OCCIQFjAC&url=http%3A%2F%2Fciteseerx.ist.psu.edu%2Fviewdoc%2Fdownload%3Fdoi%3D10.1.1.42.890%26rep%3Drep1%26typ%3Dpdf&rct=j&q=macintosh%20program%20%22i%20notice%20you%20often%22&ei=dd2MTb3QFoqVOQGsnfy, Apr. 25, 2012.

Hewlett-Packard Development Company, L.P., "HP Intelligent Management Center User Behavior Module Software", Version 2, Apr. 6, 2011, [online]. Retrieved from the Internet at <URL: http://h18000.www1.hp.com/products/quickspecs/13855_div/13855_div.PDF>, © 2010-2011 Hewlett-Packard Development Company, L.P., Total 4 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Morita, M. and Y. Shinoda, "Information Filtering Based on User Behavior Analysis and Best Match Text Retrieval", [online]. Retrieved from the Internet at <URL: http://mentor.coventry.ac.uk/MentorMaterials/Information filtering based on user behavior analysis and best match text retrieval..pdf>, Total 10 pp. Also available at: In Proceedings of SIGIR '94, ACM, New York. 272-281, Apr. 25, 2012.

Wikipedia, "Collaborative Filtering", [online], [Retrieved on Dec. 16, 2011]. Last modified on Dec. 10, 2011. Retrieved from the Internet at <URL: http://en.wikipedia.org/wiki/Collaborative_filtering> Total 5 pp.

Office Action 3, May 21, 2014, for U.S. Appl. No. 13/464,812, filed May 4, 2012 by J.P. Galvin, Jr. et al., Total 10 pp. [57.264C1 (OA3)].

Response to Office Action 3, Aug. 19, 2014, for U.S. Appl. No. 13/464,812, filed May 4, 2012 by J.P. Galvin, Jr. et al., Total 5 pp. [57.264C1 (ROA3)].

Notice of Allowance 1, Sep. 3, 2014, for U.S. Appl. No. 13/464,812, filed on May 4, 2012 by J.P. Galvin et al., Total 10 pp. [NOA1 (57.264C1)].

Supplemental Notice of Allowability, Oct. 23, 2014, U.S. Appl. No. 13/464,812, filed on May 4, 2012 by J.P. Galvin et al., Total 9 pp. [57.264C1 (SuppNtcAllowability)].

\* cited by examiner

ADAPTIVELY ASSESSING OBJECT RELEVANCE BASED ON DYNAMIC USER PROPERTIES

FIELD

Embodiments of the invention relate to adaptively assessing object relevance based on dynamic user properties.

BACKGROUND

Users of modern information systems are subject to exposure to quantities of many information objects, such as electronic mail (also referred to as emails), wiki articles, calendar invitations, microblog posts, etc. This may result in flood (i.e., too much information) and scatter (i.e., too many repositories and sources of information). Modern systems attempt to help users find their way through the data barrage by giving the users ways to organize information, to reduce the amount the users see at any one time, etc.

Some conventional systems assess and concentrate on one or more properties of the information object and organize on instances of the property. An example of this is sorting emails by date, where the date and the email type are the selected properties. Tag (topic) clouds and people's organizational hierarchies are other examples. The user's exposure to the information objects depends on which properties the user, or the system, selects to expose to the user.

SUMMARY

Provided are a method, computer program product, and system for assessing object relevance. One or more user usage patterns are retrieved. Object properties of one or more objects are retrieved. The one or more user usage patterns are compared against the object properties of the one or more objects to compute one or more interaction scores that represent a value of how an object interacts with a user based on a current context of the user. Object importance is assigned to each of the one or more objects based on the one or more interaction scores.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
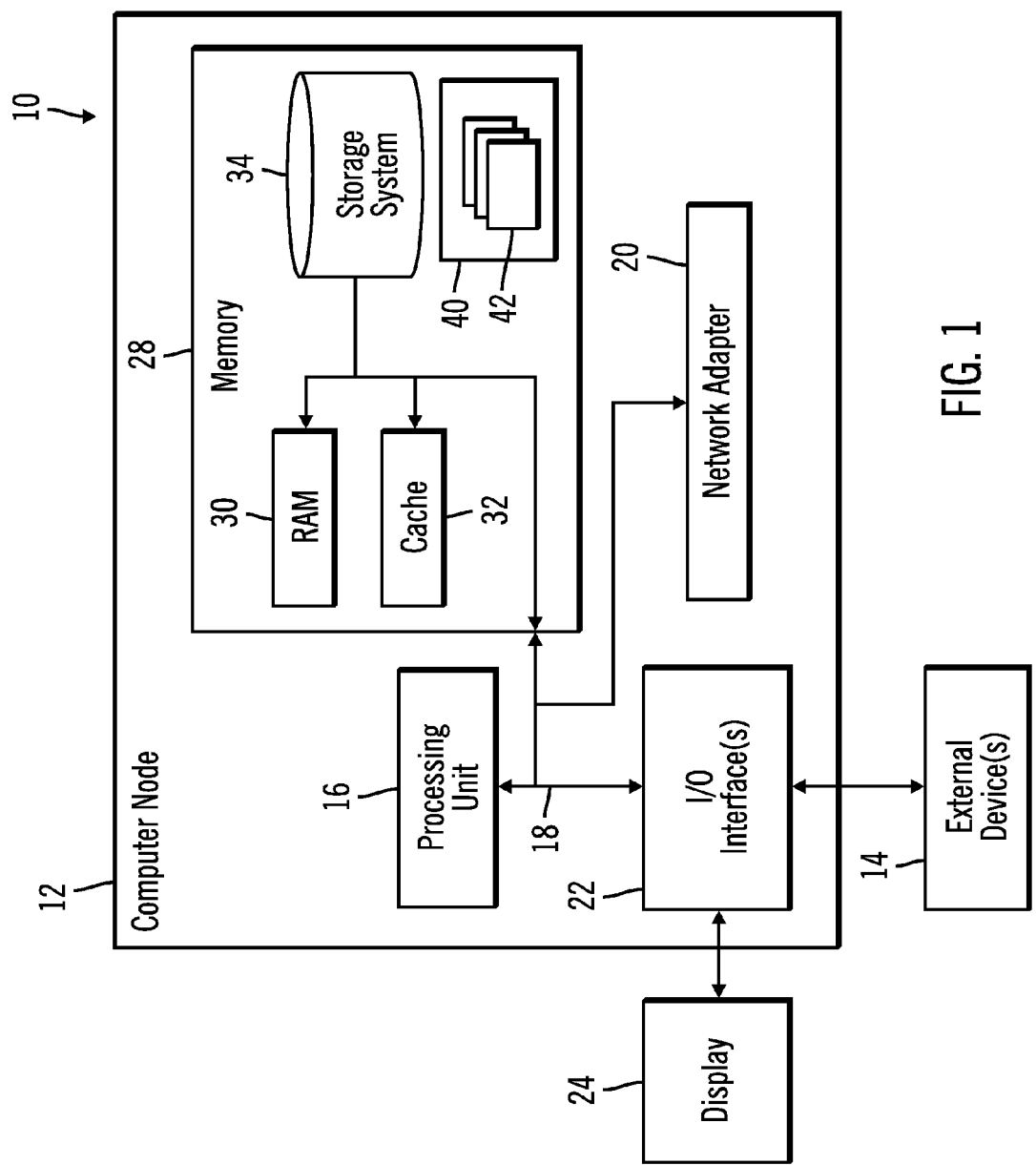
FIG. 1 depicts a cloud computing node in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
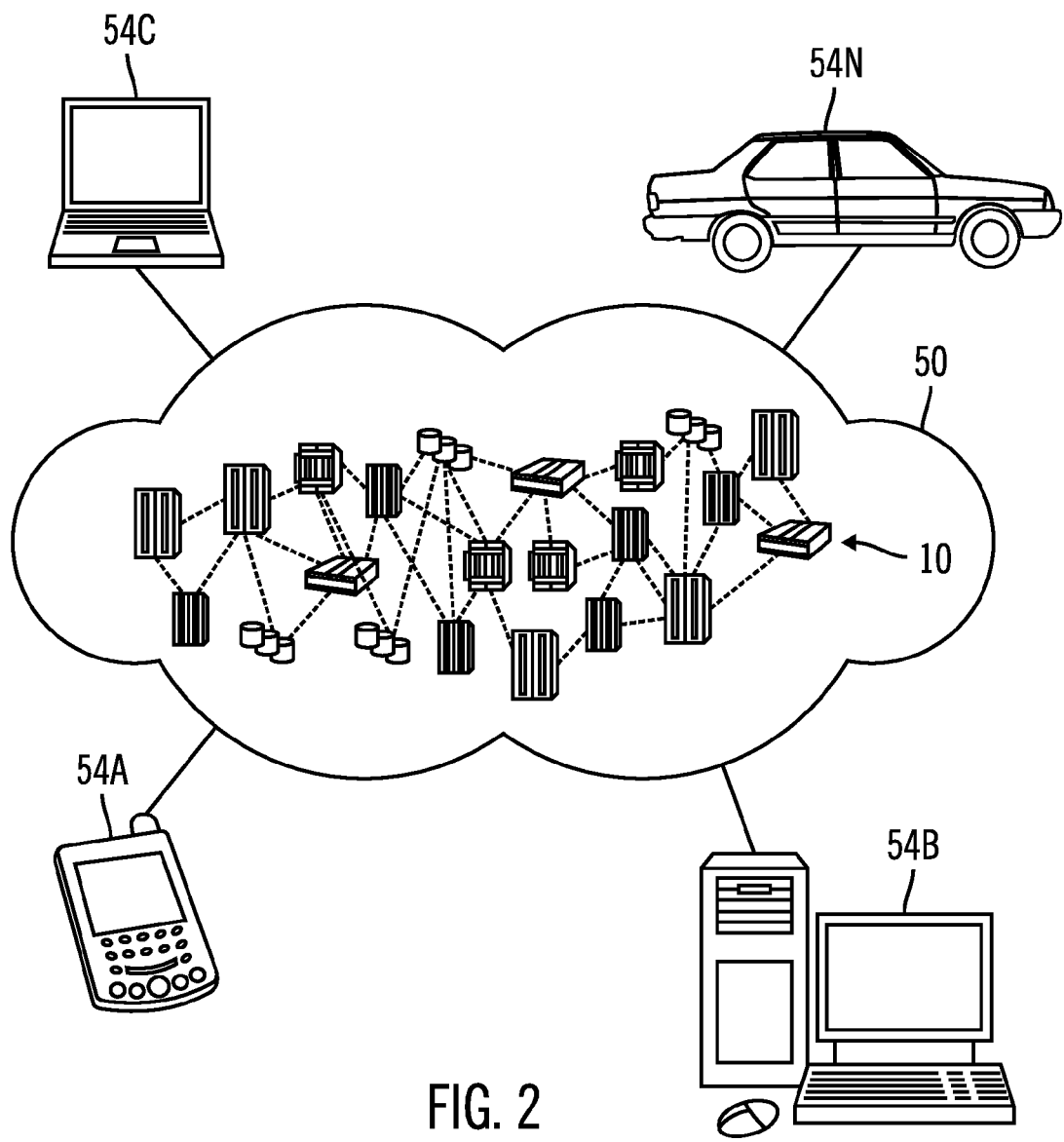
FIG. 2 depicts a cloud computing environment in accordance with certain embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
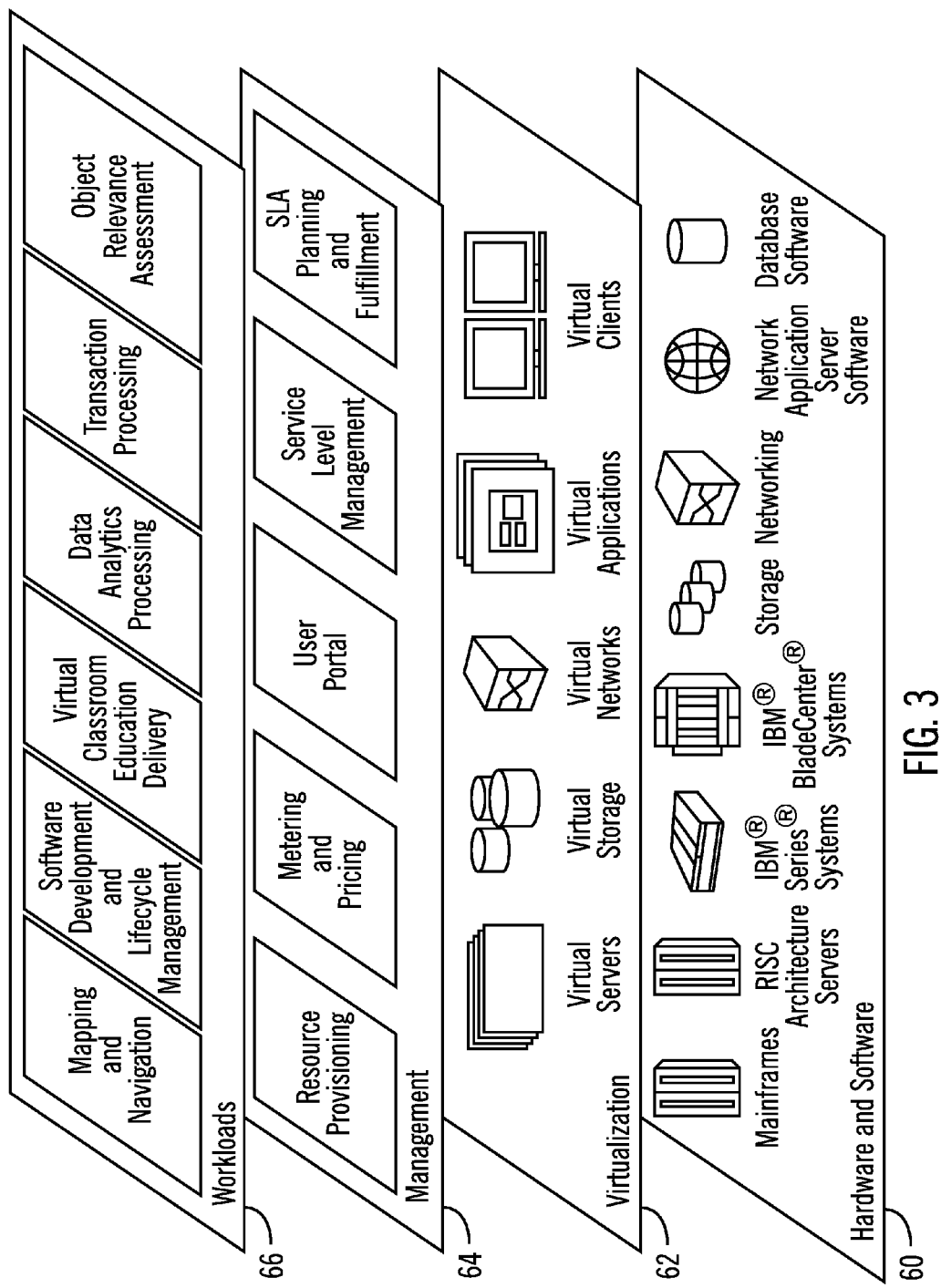
FIG. 3 depicts abstraction model layers in accordance with certain embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and object relevance assessment.

Thus, in certain embodiments, software, implementing object relevance assessment in accordance with embodiments described herein, is provided as a service in a cloud environment.

Figure 4:
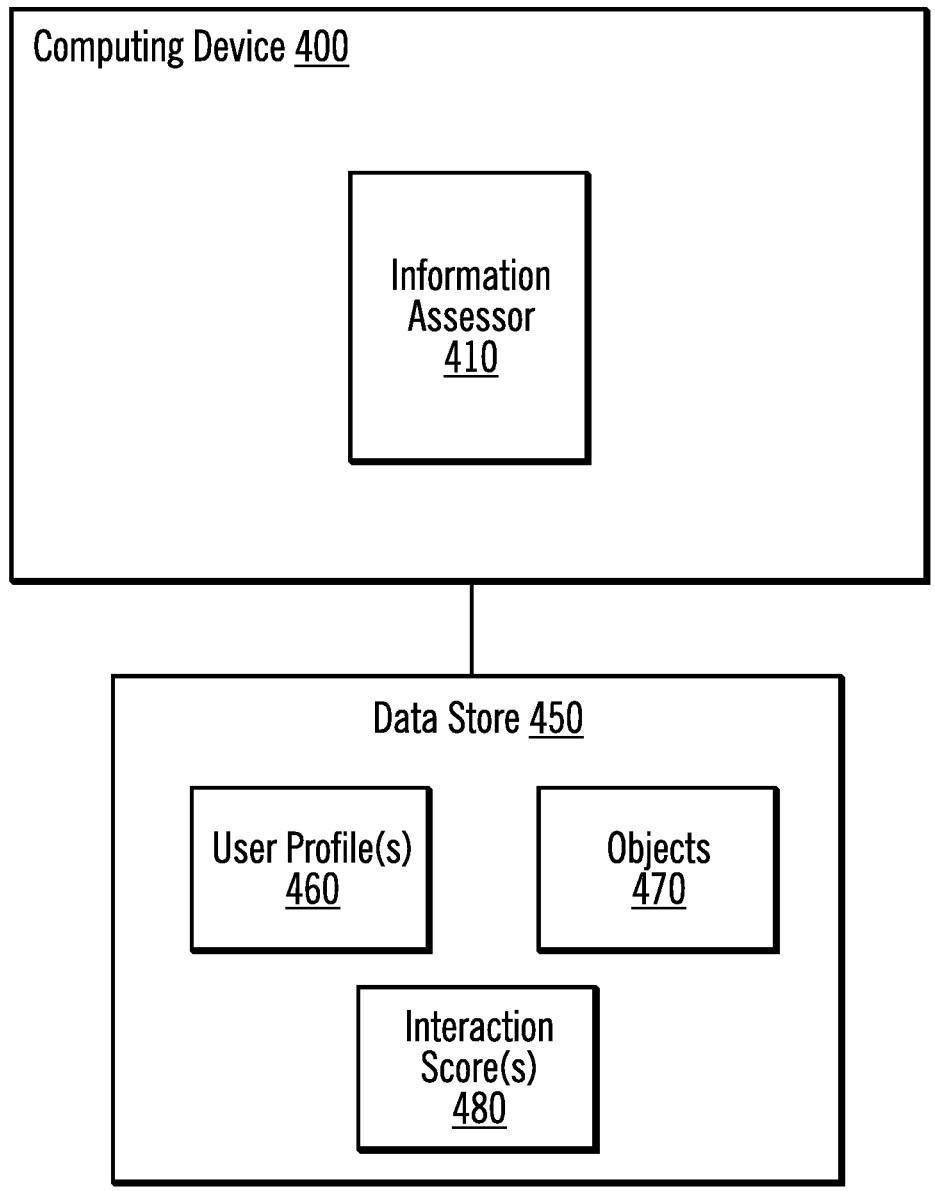
FIG. 4 illustrates a computing environment in accordance with certain embodiments.

FIG. 4 illustrates a computing environment in accordance with certain embodiments. A computing device 400 includes an information assessor 410. The computing device 400 is coupled to a data store 450. The data store 450 includes one or more user profiles 460, objects 470, and one or more interaction scores 480.

Each user may have one or more user profiles (e.g., a different profile associated with different locations, different times of the day, etc). A user profile 460 stores user properties, including user usage patterns. The user properties may include any information about the user. For example, the user properties may include the user's preferences for certain types of objects at certain times of the day or at certain locations, topics relating information the user interacts with, the frequency and recency of the user's interactions with objects and with their associated topics, people the user interacts with and the frequency and recency, etc. In certain embodiments, the information assessor 410 identifies the user properties for a user based on patterns of the user's behaviors and actions (e.g., interactions with objects 470). In certain embodiments, the user properties are provided by the user. In certain embodiments, the user properties are a combination of properties identified by the information assessor 410 and properties provided by the user.

The objects 470 include any information object with which a user may interact (e.g., view, edit, etc.). Examples of objects 470 include emails, wiki articles, calendar invitations, microblog posts.

The interaction scores 480 represent a value of how an object interacts with a user based on the user's context.

In certain embodiments, the computing device 400 may be part of a cloud environment. In other embodiments, the computing device is not part of a cloud environment.

The information assessor 410 provides a means of accounting for the combination of the properties of the information objects and the properties of the user in a way that accommodates the needs and requirements of the user with less effort by the user. That is, the information assessor 410 takes into account whether a user "should" interact with a given object 470 at a given time depending not just on the properties of the object 470, but also on the user properties in one or more user profiles 460.

For example, even if the object 470 has not changed, the ability, willingness or other property of the user may have changed, thus affecting the importance or appropriateness of interaction with the object 470. An example of this is user A who chooses to spend the first hour of the work day reading news items about "commodities trading", which is the user's special area of work. In so doing, user A is specifically choosing not to interact during that time with many other types of objects 470, such as emails, with which the user will engage later in the day. During that hour, objects 470 without properties relating to "news" and "commodities trading" are less important to user A. The properties of the other information objects have not changed, but the property of user A, in this case the user's desire to interact with other objects, does change. This may be for one or many reasons—user A may feel more open to new information at that time or may not be able to cope with the demands of email first thing in the day, etc.

Figure 5:
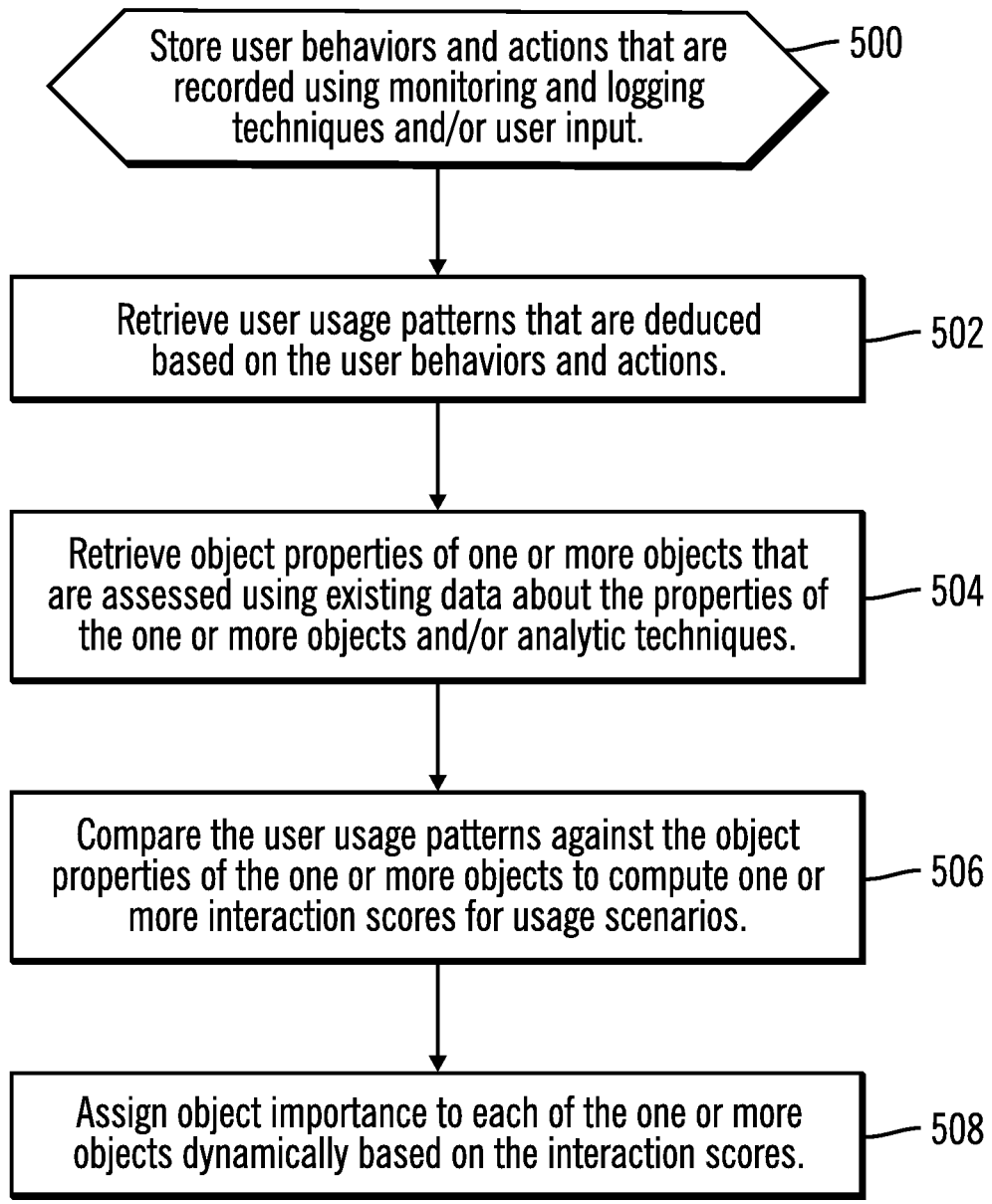
FIG. 5 illustrates, in a flow diagram, operations for assessing object relevance in accordance with certain embodiments.

FIG. 5 illustrates, in a flow diagram, operations for assessing object relevance in accordance with certain embodiments. Control begins at block 500 with the information assessor 410 storing user behaviors and actions that are recorded using monitoring and logging techniques and/or user input. For example, the user may be monitored based on location using a Global Positioning System (GPS) signal associated with the user's cell phone. As another example, when a user logs into a computer system or views web sites, the actions of the user (e.g., selecting particular Uniform Resource Locators (URLS) may be monitored and logged. As a further example, a user may provide input (e.g., via a user interface) regarding the user's behaviors and actions.

In block 502, the information assessor 410 retrieves user usage patterns that are deduced (i.e., identified) based on the user behaviors and actions. For example, the information assessor 410 may identify a pattern that a user normally logs into a work computer at 9:00 am and checks email. Such user usage patterns are stored in user profiles 460. In certain embodiments, scores (e.g., percentages) are associated with the user usage patterns.

In block 504, the information assessor 410 retrieves object properties of one or more objects that are assessed using existing data about the properties of objects and/or using analytic techniques. Tools are available to assess and record the object properties. For example, tools may derive the topics covered by the object. "What this blog entry is about." Also, name analysis may be used to find the names of people referred to in the object. In certain embodiments, scores (e.g., percentages) are associated with the object properties).

In block 506, the information assessor 410 compares the user usage patterns against the object properties of the one or more objects to compute one or more interaction scores 480 for usage scenarios. In particular, for each combination of user usage pattern and object property, an interaction score 480 that measures the user usage pattern against the object property is calculated. In certain embodiments, the interaction scores 480 are based on common properties found in both the user usage patterns and the object properties. In certain embodiments, the objects for which the interaction scores 480 are specified by a user or system administrator or are identified by the information assessor 410 based on the user usage patterns. For example, if a user often reads news websites, the information assessor 410 generates interaction scores 480 for the news websites.

Merely to enhance understanding examples are provided herein, but different items may be measured, different metadata may be tracked, and different mechanisms may be used for calculating and storing interaction scores. Also, as things change over time, interaction scores are re-calculated at sufficient intervals.

The following are examples of how interaction scores are calculated and used:
1. User reads news websites on Tuesday mornings 80% of the time.
2. When reading website news, user reads about Finance 90% of the time.
3. When reading about Finance, user reads about X Company 100% of the time.

In an example matrix of scores, an action/location/date-time item is assigned a score of 80, for example.

An action/location/topic/date-time item is assigned a score of 72 (90%*80%).

An action/location/location-instance)/topic/date-time item is assigned a score of 72 (72*100%).

Object example: On Tuesday morning, the information assessor 410 notes the time correlations and adjusts the user's social activity stream so that items not related to Finance are temporarily hidden. The information assessor 410 does this knowing that the user is generally thinking about financial matters at this time and hides unrelated information so that he is not distracted.

Action example: Knowing that the user likes to read the Company X web site at this time, the information assessor 410 automatically starts a browser and navigates to the Company X web site, saving effort for the user.

Thus, in certain embodiments, in real time, the information assessor 410 deduces the user's current activity (based on the user usage patterns) and the interaction scores 480 are used to score one or more objects currently associated with a user. In certain embodiments, the information assessor 410 uses various mechanisms to score a subset of objects potentially relevant to the user's current context.

For example, the usage scenarios for which the interaction score 480 is computed may cover many purposes including, but not limited to, whether an object is: visible to the user in a display; available to be acted on in a context; or counted or otherwise factored (including any or all of its properties) into calculations of objects used, for example, to determine system behaviors that could affect user behaviors. For example, a particular score could cause the information assessor 410 to send a message to the user's mobile device alerting them to a problem that needs attention.

In certain embodiments, a high interaction score 480 indicates that an object is logically available to participate in interactions with the user under current conditions. In certain embodiments, a low interaction score 480 indicates that interaction between the user and the object are to be avoided or are less than optimal, depending on degree.

In block 508, the information assessor 410 assigns object importance to each of the one or more objects 470 dynamically based on the interaction scores 480. In certain embodiments, the object importance is a numerical value. In certain embodiments, a higher interaction score corresponds to higher object importance. The interaction scores 480 may be described as valuing user usage pattern as they relate to object properties. Thus, the information assessor 410 assigns object importance dynamically based on patterns of behavior of the user as they relate to properties of an object.

Figure 6:
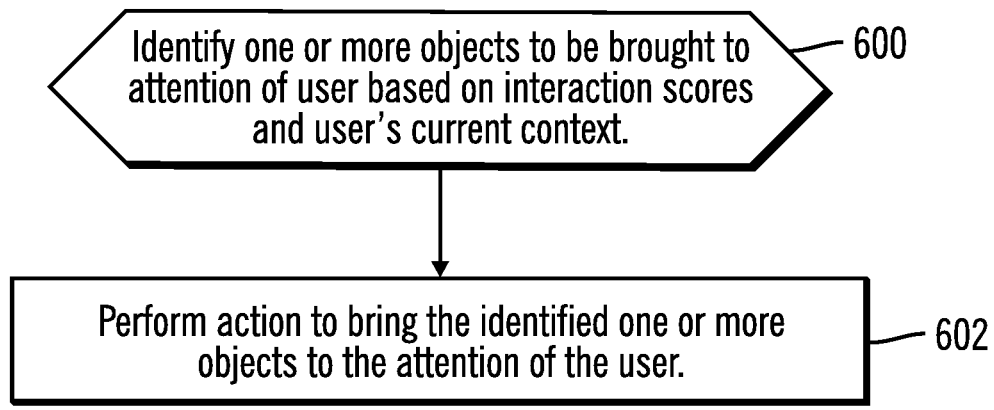
FIG. 6 illustrates, in a flow diagram, operations for providing objects to users in accordance with certain embodiments.

FIG. 6 illustrates, in a flow diagram, operations for providing objects to users in accordance with certain embodiments. Control beings at block 600 with the information assessor 410 identifying one or more objects to be brought to the attention of a user based on interaction scores 480 and user's current context (e.g., time, location (i.e., place), etc.). In block 602, the information assessor 410 performing actions to bring the identified one or more objects to the attention of the user. For example, the information assessor 410 may send a message to a user or display objects that may be of interest to the user or display information to enable the user to access those objects. Thus, the information assessor 410 uses a set of rules to act on the scored objects to provide any of a number of services including, but not limited to, automatically taking actions for objects whose score exceeds a given criteria; presenting a list of objects to the user in priority order; inhibiting actions that conflict with other high scoring objects, etc.

In certain embodiments, objects may be aggregated into groups in which object properties may be combined in one or more ways (ANDed, ORed, XORed, etc.) and assessed as a single entity by the information assessor 410.

In certain embodiments, if not much data exists for user behavior patterns (e.g., when the user has just begun to interact with the information assessor 410), behavior patterns may be derived from other users related to the particular user by one or more properties. For example, for a particular user, if co-workers are to attend a weekly meeting, the information assessor 410 may determine that the particular user may also attend that meeting.

In certain embodiments, other behavior patterns may be combined with, or used instead of, those of the particular user for various purposes, whether or not sufficient behavior patterns already exist for the particular user.

In certain embodiments, the frequency of computation of interaction scores 480 can range from perpetual to occasional, depending on the goals and constraints of the information assessor 410.

In certain embodiments, the information assessor 410 may choose to react to interaction scores 480 in different ways (e.g., at different times, when the user is in different locations, etc.). For example, an "avoidance" feature might choose to implement reverse behavior from that described above and display objects with low interaction scores 480 and hide objects with high interaction scores 480.

Thus, the information assessor 410 combines the properties of objects and the properties of a user in different circumstances in such a way that the information assessor 410 adapts to the needs and requirements of the user as user conditions change.

The following provides a simple example: The user pattern is that the user generally writes a status report Friday afternoon at 4 PM. The information assessor 410 makes tasks completed this week available to the user in an aggregated document each Friday at 3:50 PM and at 4 PM minimizes to the taskbar all running applications that are not needed to prepare the status report.

As another example, the user pattern is that the user periodically stops for coffee on the way to the office and usually checks a product's critical situation list on a smartphone. The information assessor 410, on days when the user does not arrive (i.e., begin using the work computer at the office) at the usual time, sends a critical situation list notification to the user's smartphone.

Thus, the information assessor 410 filters out information not relevant to the circumstances defined by changing user usage patterns. The information assessor 410 dynamically alters a user's view of objects based on user usage patterns with reference to user properties, such as time and location.

The information assessor 410 provides real-time deduction of both activity and context, which together are used to generate the interaction scores 480. The information assessor 410 uses context to improve the ability to correlate activity and user options with object valuation.

In certain embodiments, the information assessor 410 provides a technique for presenting and ordering information based on the current activities of a user. The information assessor 410 maintains a set of objects for a user that define actions a user may take or information that may be presented to the user. These objects may be grouped or combined logically so that operations may act on a single or related set of objects.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, any storage device, such as: an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer system for assessing object relevance, comprising:
   a processor; and
   a storage device connected to the processor, wherein the storage device has stored thereon a program, and wherein the processor is configured to execute instructions of the program to perform operations, wherein the operations comprise:
   deducing at least one usage pattern based on monitoring user behaviors and actions for at least one of different locations and different times for a user;
   retrieving one or more user usage patterns including the at least one deduced usage pattern and scores associated with the one or more usage patterns;
   retrieving object properties of one or more objects and scores associated with the object properties;
   comparing the one or more user usage patterns against the object properties of the one or more objects to identify common properties found in the one or more user usage patterns and the object properties;
   computing, at intervals, one or more interaction scores that represent a value of how an object interacts with a user based on a current location of the user and a current time based on the common properties, the scores associated with the one or more usage patterns, and the scores associated with the object properties; and
   performing an activity to bring attention of the user to at least one of the one or more objects based on the interaction scores and an action monitored for the one or more usage patterns.

2. The computer system of claim 1, wherein a higher interaction score corresponds to higher object importance.

3. The computer system of claim 1, wherein the operations further comprise:
   using logging techniques to identify the user behaviors and actions.

4. The computer system of claim 1, wherein the operations further comprise:
   obtaining user input to identify the user behaviors and actions.

5. The computer system of claim 1, wherein the operations further comprise:
   computing the one or more interaction scores for various usage scenarios.

6. The computer system of claim 1, wherein the operations further comprise:
   identifying at least one of the one or more objects on which to perform an action with reference to the user based on the interaction scores and the current location of the user and the current time; and
   performing the action.

7. A computer program product for assessing object relevance, the computer program product comprising:
   a non-transitory computer readable storage medium having computer readable program code embodied therewith, wherein the computer readable program code, when executed by a processor of a computer, is configured to perform:
   deducing at least one usage pattern based on monitoring user behaviors and actions for at least one of different locations and different times for a user;
   retrieving one or more user usage patterns including the at least one deduced usage pattern and scores associated with the one or more usage patterns;
   retrieving object properties of one or more objects and scores associated with the object properties;
   comparing the one or more user usage patterns against the object properties of the one or more objects to identify common properties found in the one or more user usage patterns and the object properties;
   computing, at intervals, one or more interaction scores that represent a value of how an object interacts with a user based on a current location of the user and a current time based on the common properties, the scores associated with the one or more usage patterns, and the scores associated with the object properties; and
   performing an activity to bring attention of the user to at least one of the one or more objects based on the interaction scores and an action monitored for the one or more usage pattern.

8. The computer program product of claim 7, wherein a higher interaction score corresponds to higher object importance.

9. The computer program product of claim 7, wherein the computer readable program code, when executed by the processor of the computer, is configured to perform:
   using logging techniques to identify the user behaviors and actions.

10. The computer program product of claim 7, wherein the computer readable program code, when executed by the processor of the computer, is configured to perform:
    obtaining user input to identify the user behaviors and actions.

11. The computer program product of claim 7, wherein the computer readable program code, when executed by the processor of the computer, is configured to perform:
    computing the one or more interaction scores for various usage scenarios.

12. The computer program product of claim 7, wherein the computer readable program code, when executed by the processor of the computer, is configured to perform:
    identifying at least one of the one or more objects on which to perform an action with reference to the user based on the interaction scores and the current location of the user and the current time; and
    performing the action.

13. The computer program product of claim 7, wherein a Software as a Service (SaaS) is configured to perform the computer program product operations.

14. The computer system of claim 1, wherein a Software as a Service (SaaS) is configured to perform the system operations.

* * * * *